(12) United States Patent
Lin

(10) Patent No.: US 7,673,295 B1
(45) Date of Patent: Mar. 2, 2010

(54) SYSTEM AND METHOD FOR COMPILE-TIME NON-CONCURRENCY ANALYSIS

(75) Inventor: Yuan Lin, Sunnyvale, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 974 days.

(21) Appl. No.: 10/832,943

(22) Filed: Apr. 27, 2004

(51) Int. Cl.
*G06F 9/44* (2006.01)
*G06F 9/45* (2006.01)

(52) U.S. Cl. ............... 717/156; 717/119; 717/132; 717/144; 717/149

(58) Field of Classification Search ......... 717/140–149, 717/157, 154, 156
See application file for complete search history.

(56) References Cited

U.S. PATENT DOCUMENTS

| | | | |
|---|---|---|---|
| 5,048,018 A * | 9/1991 | Bernstein et al. | 717/131 |
| 5,230,053 A * | 7/1993 | Zaiki | 717/150 |
| 6,106,575 A * | 8/2000 | Hardwick | 717/119 |
| 6,286,130 B1 * | 9/2001 | Poulsen et al. | 717/119 |
| 6,324,496 B1 * | 11/2001 | Alur et al. | 703/17 |
| 6,343,371 B1 * | 1/2002 | Flanagan et al. | 717/124 |
| 6,792,599 B2 * | 9/2004 | Poulsen et al. | 717/136 |
| 6,922,830 B1 * | 7/2005 | Schmidt | 717/155 |
| 7,017,129 B2 * | 3/2006 | Ouyang | 716/4 |
| 7,076,776 B2 * | 7/2006 | Kim et al. | 717/160 |
| 7,100,164 B1 * | 8/2006 | Edwards | 718/108 |
| 7,316,005 B2 * | 1/2008 | Qadeer et al. | 717/131 |
| 2002/0188651 A1 * | 12/2002 | Choi et al. | 709/107 |
| 2003/0097653 A1 * | 5/2003 | Kim et al. | 717/160 |
| 2003/0140326 A1 * | 7/2003 | Ouyang | 716/6 |

OTHER PUBLICATIONS

Masticola et al., "Non-concurrency Analysis", 1993, ACM press, ISBN 0-89791-589-5, pp. 129-138.*
Eggers et al., "Static Analysis of Barrier Synchronizatioin in Explicitly Parallel Programs", retrieved from <http://citeseerx.ist.psu.edu/viewdoc/summary?doi=10.1.1.53.1283>, 1994, pp. 1-10.*
Satoh et al., "Compiler Optimization Techniques for OpenMP Programs", retrieved from <http://citeseerx.ist.psu.edu/viewdoc/summary?doi=10.1.1.12.9275>, 2001, pp. 1-10.*
Balasundaram et al., "Compile-time Dectection of Race Conditions in a Parallel Program", ACM,1989, pp. 1-11.*
Netzer et al., "Race Conditioin Dection for Debugging Shared-Memory Parallel Programs", retrieved from <http://citeseerx.ist.psu.edu/viewdoc/summary?doi=10.1.1.42.5664>,1991, pp. 1-118.*
Kinariwala et al. "Programming in C" Sep. 3, 1994, retreived from http://ee.hawaii.edu/~tep/EE160/Book/>,1994, pp. 1-9.*

(Continued)

*Primary Examiner*—Tuan Q Dam
*Assistant Examiner*—Marina Lee
(74) *Attorney, Agent, or Firm*—Dorsey & Whitney LLP

(57) ABSTRACT

Compile-time non-concurrency analysis of parallel programs improves execution efficiency by detecting possible data race conditions within program barriers. Subroutines are modeled with control flow graphs and region trees having plural nodes related by edges that represent the hierarchical loop structure and construct relationship of statements. Phase partitioning of the control flow graph allows analysis of statement relationships with programming semantics, such as those of the OpenMP language, that define permitted operations and execution orders.

19 Claims, 7 Drawing Sheets

OTHER PUBLICATIONS

Banerjee et al., "Automatic Program Parallelization", IEEE, vol. 81. No. 2. Feb. 1993, retrieved from <http://cobweb.ecn.purdue.edu/~eigenman/reports/BENP93.pdf> pp. 1-33.*

Miguel Hermanns, "Parallel Programming in Fortran 95 using OpenMP", Apring 19, 2002, retrieved from <http://www.openmp.org/presentations/miguel/F95_OpenMPv1_v2.pdf>, pp. 1-75.*

Dieter an Mey, "A compromise between Automatic and Manual Parallelization: Auto-Scoping", Aachen, Sep. 12, 2001, Retrieved from <http://support.rz.rwth-aachen.de/public/AutoScoping.pdf>, pp. 1-5.*

Yuan Lin "*Static Nonconcurrency Analysis of OpenMP Programs*" Jan. 9, 2004.

Jeremiassen et al., "Static Analysis of Barrier Synchronization in Explicitly Parallel Programs", Conference on Parallel Architectures and Compilation Techniques, pp. 171-180, Aug. 1994.

* cited by examiner

```
foreach barrier N^b_i in control-flow-graph
    foreach successor N_j of N^b_i
        forward_mark(N_j, N^b_i) ;
    foreach predecessor N_k of N^b_i
        backward_mark(N_k, N^b_i);

foreach non-barrier node N in control-flow-graph
    foreach N^b_i in p_start(N)
        foreach N^b_j in p_end(N) that ORC(N^b_i).pregion = ORC(N^b_j).pregion
            phase(N^b_i, N^b_j) := phase(N^b_i, N^b_j) U {N}
            in_phase(N) := in_phase(N) U {(N^b_i, N^b_j)} ;

forward_mark(N, N^b)
{
    if (N is a barrier node and ORC(N).pregion = ORC(N^b).pregion)
        return ;

p_start(N) := p_start(N) U {N^b};

foreach successor N_j of N
        forward_mark(N_j, N^b) ;
} backward_mark(N, N^b)
{
    if (N is a barrier node and ORC(N).pregion = ORC (N^b).pregion)
        return;

p_end(N) := p_end(N) U {N^b};

foreach predecessor N_k of N
        backward_mark(N_k, N^b) ;
}
```

*Figure 4*

SYSTEM AND METHOD FOR COMPILE-TIME NON-CONCURRENCY ANALYSIS

BACKGROUND OF THE INVENTION

1. Field of the Invention

The present invention relates in general to the field of parallel program compilation, and more particularly to a system and method for compile-time non-concurrency analysis of parallel programs.

2. Description of the Related Art

Shared memory parallel programming provides a powerful tool for performing complex processing across multiple threads. For instance, the industry-defined OPENMP application program interface supports multi-platform, shared memory parallel programming in a number of sequential languages, such as Fortran and C++, across a number of different architectures, such as UNIX or WINDOWS NT platforms. OPENMP supports incremental writing of parallel programs by extending base sequential languages with a set of compiler directives, runtime library routines and environmental variables so that well-structured code blocks and well-defined semantics improve compiler analysis. However, writing correct and efficient parallel programs presents the difficulty of managing concurrent execution of parallel routines by different threads in a team. Concurrency occurs where the execution order of different threads is not enforced and thus synchronization must be used to control shared resources.

Static non-concurrency analysis serves as the base for a number of techniques used to analyze or optimize parallel programs, such as programs that use OPENMP. For instance, static non-concurrency analysis is used for race detection, dead-lock detection, unnecessary lock/barrier removal, synchronization optimization and debugger support. As a specific example, race detection detects general races, which occur when the order of two accesses to the same memory location is not enforced by synchronization. General races are classified as data races, which occur when the access to memory is not guarded by critical sections, and synchronization races. A correct OPENMP program may contain synchronization races but is generally expected to be free of data races. If any two accesses to the same memory location cannot be executed concurrently, then a general race is not possible. If two accesses can be executed concurrently and the accesses are guarded by critical sections, then a synchronization race is possible while a data race is not possible. If a race condition is possible for an OPENMP program, the behavior of the program is undeterministic.

For another example, in order to correctly compile a typical OPENMP program, users generally perform a manual scope of each variable used in parallel regions to define allowed memory accesses of a variable as shared, meaning that all threads share a single copy of the variable, or private, meaning that each thread accesses only its own copy of the variable. Other scopes for variables include firstprivate, lastprivate, reduction or threadprivate scopes. Accurate scoping of variables is tedious and error prone, typically including at least some non-concurrency analysis to ensure that data races do not exist and to otherwise optimize program execution. If a data race is possible for a variable in a parallel region, the data race generally is eliminated by serializing the associated code and scoping the variable as shared.

Determining exact concurrency in a given OPENMP program is difficult, especially with complex programs, and is practically impossible on a real-time basis during compile of a program. A variety of proposals have been made for detecting race conditions and non-determinacy in parallel programs, however, available techniques generally use low-level event variable synchronization, such as post/wait and locks. Such techniques tend to be inefficient and complex. Another proposal for detecting race conditions and non-determinacy with a compile-time non-currency analysis uses barriers that divide a parallel program into a set of phases separated by the barriers. However, the known barrier-based analysis fails to detect non-concurrency within a phase. Another alternative is run-time detection of race conditions and other synchronization anomalies, however runtime detection techniques generally have relatively large execution overhead that limits their use to small test cases.

SUMMARY OF THE INVENTION

Therefore a need has arisen for a system and method which efficiently performs compile-time non-concurrency analysis of parallel programs.

In accordance with the present invention, a system and method are provided which substantially reduce the disadvantages and problems associated with previous methods and systems for non-concurrency analysis of parallel programs. Program statements are modeled as nodes in a control flow graph and region tree representation. The program model is partitioned into phases for analysis of non-concurrency by comparing the nodes and static phases according to permitted semantics of the programming language.

The present invention provides a number of important technical advantages. One example of an important technical advantage is that the non-concurrency analysis applies the semantics of OPENMP directives and takes advantage of the well constructed nature of compliant programs to efficiently detect potential sequencing anomalies. The static non-concurrency analysis supports automated compile-time analysis with a complexity linear to the size of the program under analysis and manages nested parallelism and orphaned constructs. Accurate and efficient static non-concurrency analysis supports compile-time detection of race conditions in parallel programs as well as dead-lock detection, unnecessary lock/barrier removal, synchronization optimization and debugger support. In addition, the control flow graph and region tree aid OPENMP compiler analysis and optimizations to provide more efficient parallel program compiles.

Another technical advantage of the present invention is that it improves the efficiency of run-time detection of race conditions and other synchronization anomalies. Compile-time static non-concurrency analysis allows removal of unnecessary checks in run-time detection techniques so that the run-time detection overhead is reduced to an efficient level. Run-time detection and correction of synchronization anomalies permits selection of programming and compilation techniques that accept some risk of synchronization anomalies detectable at run-time in exchange for more efficient operating constructs.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

FIG. 4 depicts a phase partitioning algorithm;

DETAILED DESCRIPTION

Compile-time detection of non-concurrency in parallel programs aids in optimization of program performance by taking advantage of parallel processing without introducing errors through synchronization anomalies. A compiler automatically analyzes the semantics of OPENMP directives and takes advantage of the well-constructed nature of compliant OPENMP programs to determine non-concurrency within a parallel program phase. The system and method described herein use an OPENMP program in the base sequential language of Fortran, although the system and process may be applied to alternative programs and/or base languages. The non-concurrency analysis provides a close underestimate of the actual non-concurrency in a parallel program so that determination of non-concurrency is deterministic while a failure to determine non-concurrency indicates that two statements may but need not execute concurrently. Detection of concurrent execution of two statements by different threads in a team allows automated alteration to the compile so that synchronization anomalies are avoided or, alternatively, allows notice of the difficulty to a user. Examples of the non-concurrency analysis are set forth in the paper "Static Nonconcurrency Analysis of OPENMP Programs" by Yuan Lin, the inventor hereof, attached hereto as an appendix and incorporated herein.

Figure 1:
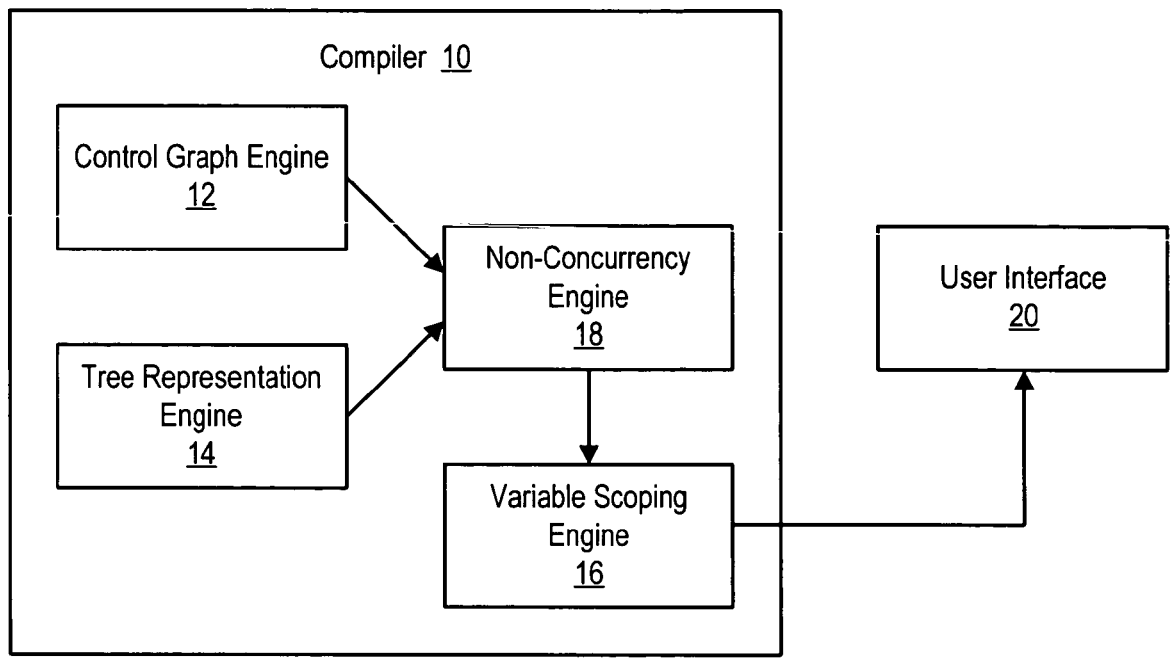
FIG. 1 depicts a block diagram of a system for compile-time non-concurrency analysis.

Referring now to FIG. 1, a block diagram depicts a compiler 10 operable to perform compile-time non-concurrency analysis of parallel programs. Compiler 10 includes a control graph engine 12 that models control flow in a parallel program during compile, and also includes a tree representation engine 14 that models the hierarchical structure of the program's loops and constructs. A non-concurrency engine 18 applies the control graph and tree representation to partition the program into phases and use semantics of parallel constructs to determine non-concurrency. A variable scoping engine 16 automatically scope the variables of the programs. If during scope analysis of a variable a possibility of a data race condition exists, the variable is analyzed by non-concurrency engine to determine whether non-concurrency exists. If non-concurrency engine 18 confirms non-concurrency, then variable scoping engine 16 scopes the variable appropriately. If non-concurrency engine 18 cannot confirm non-concurrency, then variable scoping engine alters compile to preclude occurrence of a sequencing anomaly or, alternatively, presents a warning of the potential non-concurrency to a user interface 20 for appropriate action.

As an example of the use of the semantics of OPENMP directives to model and analyze for non-concurrency at compile-time, the following program includes two phases, one with non-concurrency and one without:

| 1. | !$omp parallel |
| 2. | |
| 3. | a=... |
| 4. | |
| 5. | !$omp single |
| 6. | b=... |
| 7. | c=... |
| 8. | !$omp end single |
| 9. | |
| 10. | !$ompdo |
| 11. | do i=1, 100 |
| 12. | c(i)=... |
| 13. | end do |
| 14. | !$omp end do nowait |
| 15. | |
| 16. | !$omp end parallel |

All threads in the team executing the parallel region will start from statement 3 and go through to statement 15. The program contains a first phase of statements 3 through 8 and a second phase of statements 10 through 14 with an implicit barrier at line 8 partitioning the phases inside of the parallel region of statements 3 through 14. The first phase includes a singe directive at statement 5 that instructs that only one thread can execute statements in the single construct of statements 6 and 7. The second phase includes a do directive at statement 10 that instructs iterations of the loop to be divided across the team of threads. No instance of any two statements of the first and second phases will be executed concurrently as defined by the implicit barrier, however, two statements within each phase may be executed concurrently. In the first phase, two threads may concurrently execute statements 3 and 6, statements 3 and 7 and statement 3, however the single directive of statement 5 mandates only one thread can concurrently execute statements 6 and 7 thereby confirming their non-concurrency. In order to partition a given parallel program into phases and determine the non-concurrency of the phases, compiler 10 generates a control flow graph and region tree for analysis.

Figure 2:
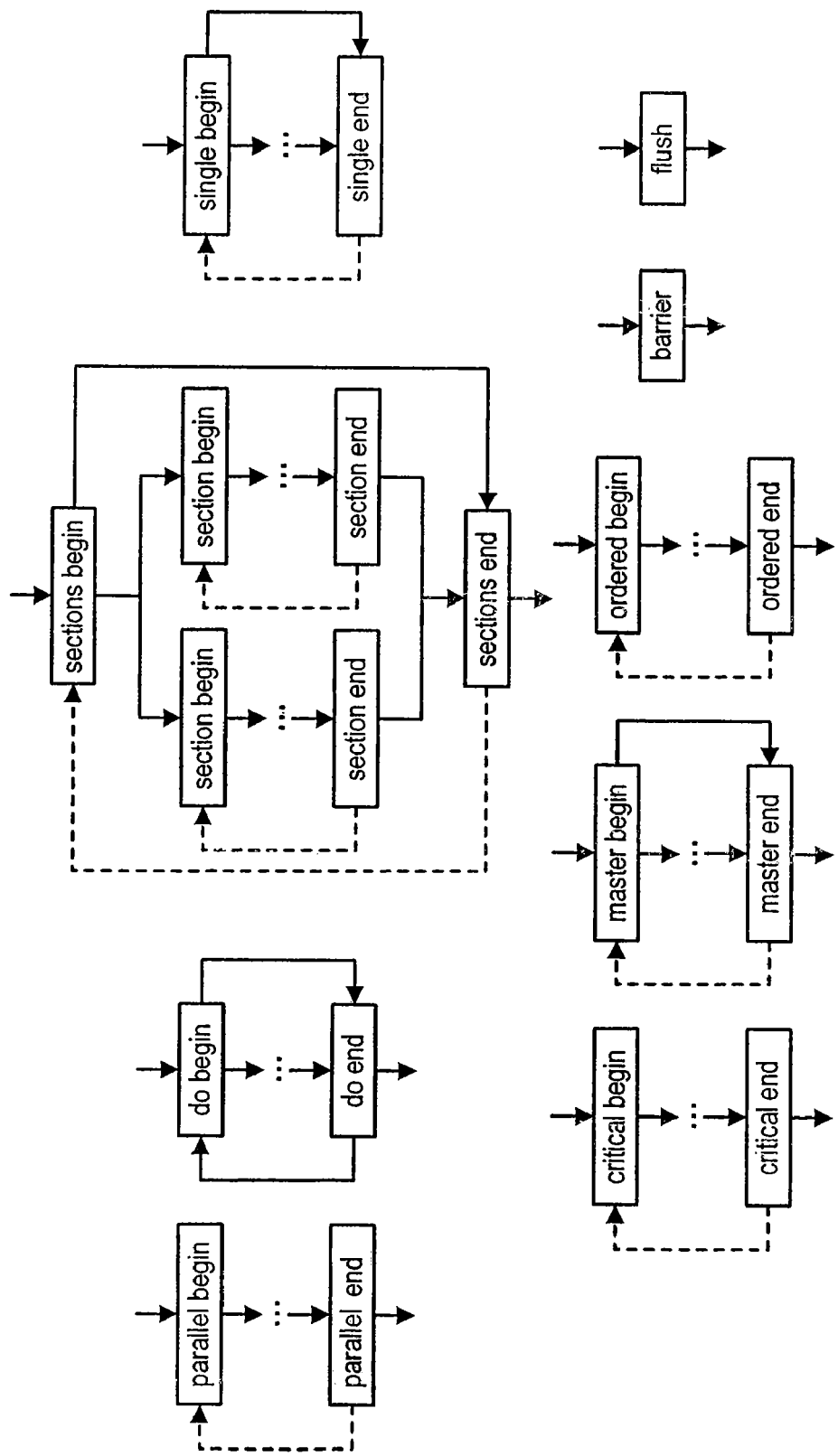
FIG. 2 depicts examples of directive nodes identified by a control graph engine.

Referring now to FIG. 2, examples of directive nodes identified by a control graph engine are depicted. The control flow graph models the transfer of control flow in a subroutine with interrelated nodes. Each node is a statement or directive, with each statement of a subroutine partitioned into basic blocks and each directive put into an individual block. For OPENMP, implicit barriers are made explicit to simplify compiler analysis, and each combined parallel work-sharing construct, such as parallel do and parallel sections, is separated into a no-waiting work-sharing construct nested in a parallel region. Parallel begin directive nodes and parallel end directive nodes are considered as barrier nodes in the parallel region defined by the directive nodes. Edges between the nodes represent the flow of control of a thread with control starting at a single entry node and ending at a single exit node. Edges between basic nodes are created according to the underlying sequential language while edges between basic nodes and directive nodes or between directive nodes are created according to the semantics of OPENMP. Statement inside an OPENMP construct form a single-entry/single-exit region with each construct having an edge created from the directive begin node to the single-entry node of the region and an edge created from the single-exit node of the region to the direct end node. Edges in and from barrier and flush nodes are created as if they are basic nodes. An edge is created from the sections begin node to its binding sections end node, and from each section end node to its binding section end node. FIG. 2 depicts the possible directive nodes of an OPENMP program and the corresponding edges.

Figure 3A:
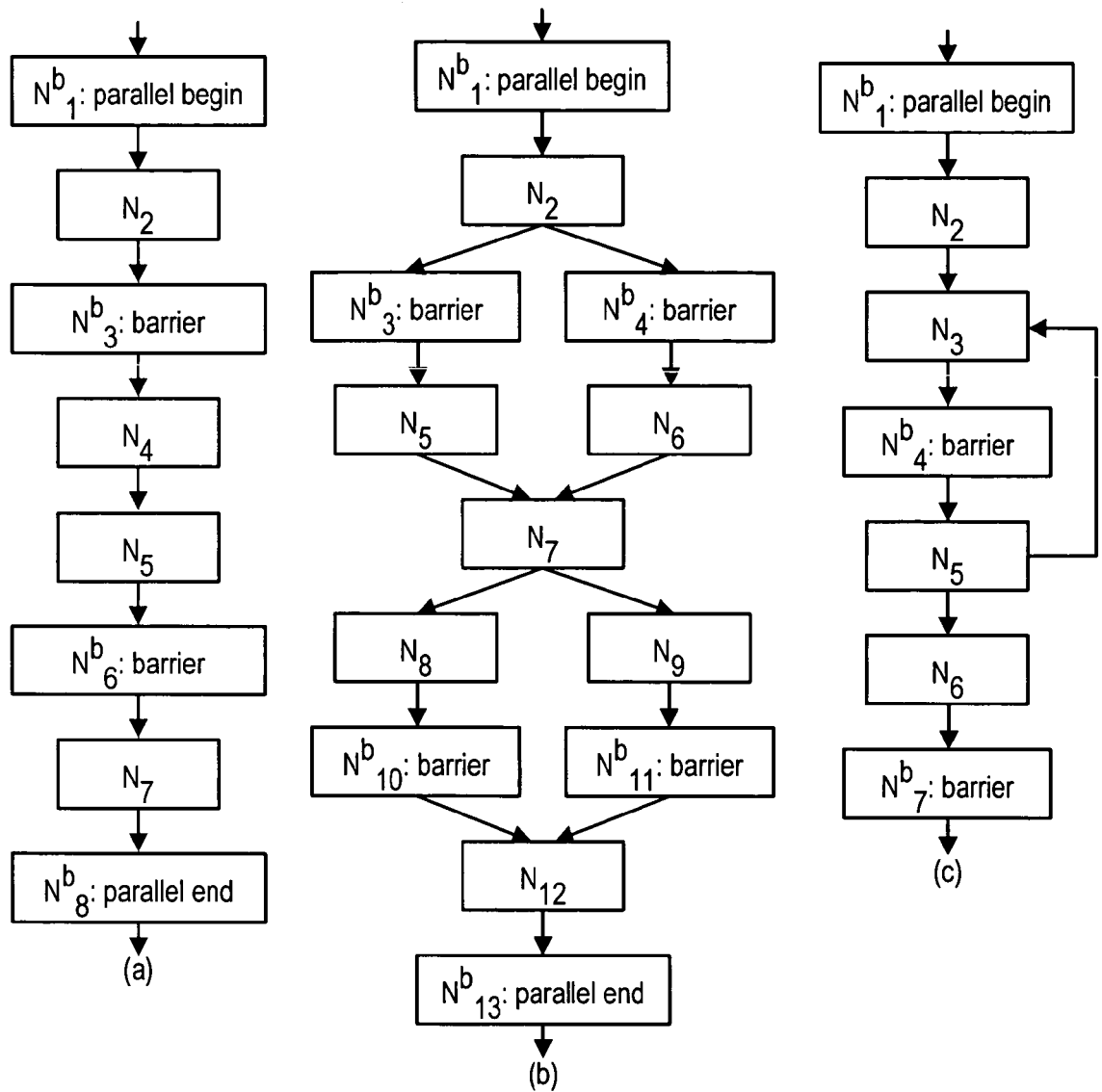
FIG. 3 depicts examples of phases identified by a phase partitioning algorithm.

Both the hierarchical loop structure of loops in a subroutine and the hierarchical OPENMP construct structure of a subroutine. The region tree is built by creating construct edges in the control flow graph from end construct directive nodes to their associated begin construct directive nodes. The construct edges of FIG. 2 are depicted by dotted lines and do not reflect any control flow of the subroutine while the solid lines depict control flow lines. The construct edges are inserted to form a cycle in the control flow graph and therefore allow application of conventional loop tree detection algorithms used in sequential programs to find both sequential program loops and construct regions in an OPENMP subroutine. The combination of the sequential program loop tree with the OPENMP construct tree provides an OPENMP region tree in which each node represents either a loop or an OPENMP construct. FIG. 3a depicts simple phases in one parallel region.

Figure 3B:
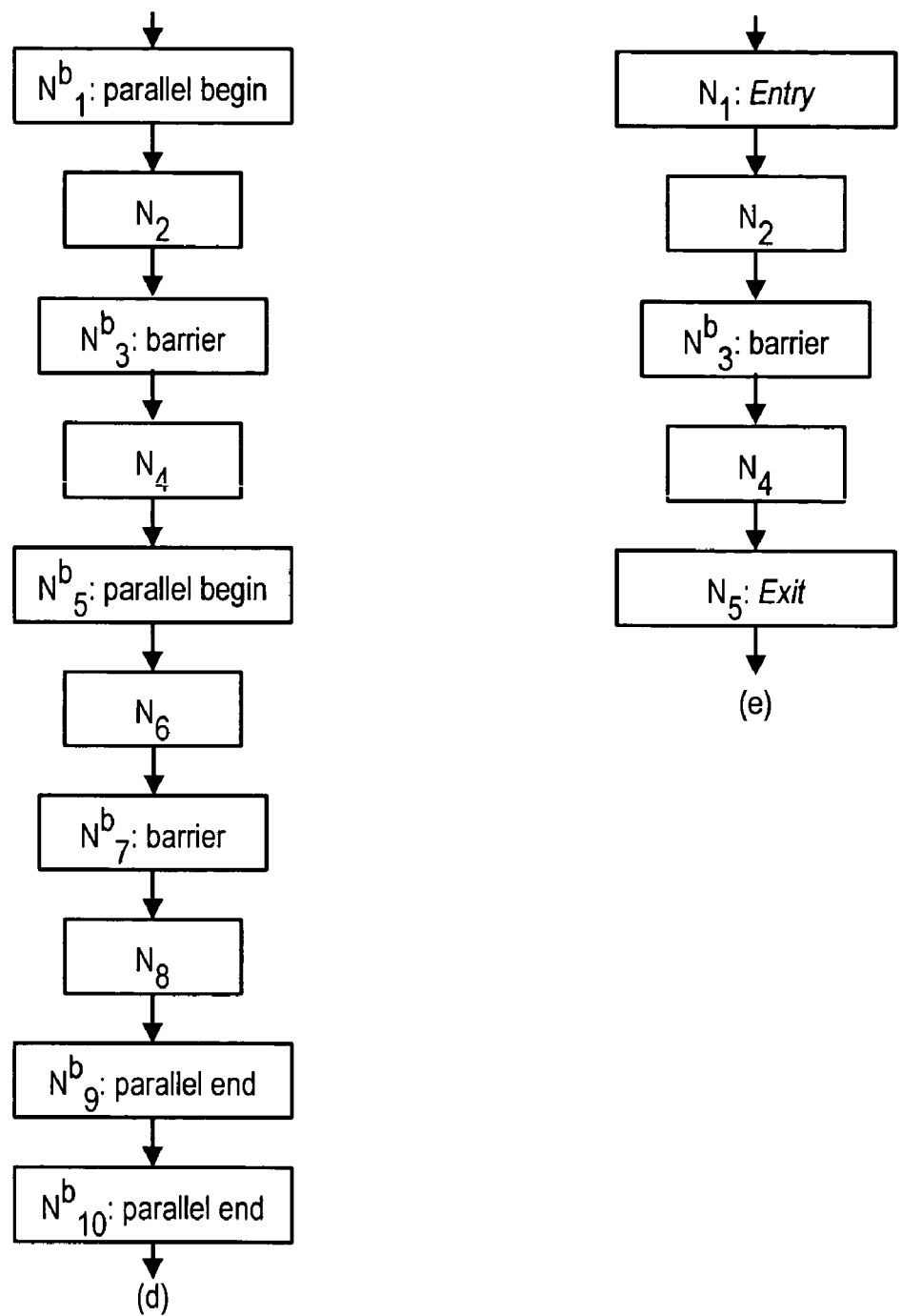

Referring now to FIG. 3, examples of phases in parallel programs are depicted. FIG. 3b depicts OPENMP restrictions on how barriers should be encountered by threads in a team. FIG. 3c depicts phases in a loop. FIG. 3d depicts phases in nested parallel regions. FIG. 3e depicts orphan phrases. Barriers are the most frequently used synchronization technique in OPENMP, whether inserted through the barrier directive or implied at the end of worksharing constructs or parallel regions. In addition, the OPENMP standard requires "BARRIER directives must be encountered by all threads in a team or by none at all, and they must be encountered in the same order by all threads in a team." For example, in the control flow diagram of FIG. 3b all threads in a team must execute the barriers $N^b_3$, $N^b_4$, $N^b_{10}$ and $N^b_{11}$ in the same order if encountered, and it is, for instance, illegal for one thread to be at barrier $N^b_3$ while another thread of the same team is at barrier $N^b_4$. Recognition of the impact of this semantic by the phase partitioning algorithm allows identification within barriers of sequencing anomalies by partitioning execution of a parallel region into a set of distinct, non-overlapping run-time phases. No two statement instances in two different run-time phases will ever be executed concurrently by different threads in a team, thus ensuring non-concurrency across different phases in compliant programs. The following table depicts the separate phases and nodes in each phase for the tree representations of FIG. 3:

| Control Flow Graph | Phase | Nodes in Phase |
|---|---|---|
| (a) | $<N^b_1, N^b_3>$ | $N_2$ |
|  | $<N^b_3, N^b_6>$ | $N_4, N_5$ |
|  | $<N^b_6, N^b_8>$ | $N_7$ |
| (b) | $<N^b_1, N^b_3>$ | $N_2$ |
|  | $<N^b_1, N^b_4>$ | $N_2$, |
|  | $<N^b_3, N^b_{10}>$ | $N_5, N_7, N_8$ |
|  | $<N^b_3, N^b_{11}>$ | $N_5, N_7, N_9$ |
|  | $<N^b_4, N^b_{10}>$ | $N_6, N_7, N_8$ |
|  | $<N^b_4, N^b_{11}>$ | $N_6, N_7, N_9$ |
|  | $<N^b_{10}, N^b_{13}>$ | $N_{12}$ |
|  | $<N^b_{11}, N^b_{13}>$ | $N_{12}$ |
| (c) | $<N^b_1, N^b_4>$ | $N_2, N_3,$ |
|  | $<N^b_4, N^b_4>$ | $N_5, N_3$ |
|  | $<N^b_4, N^b_7>$ | $N_5, N_6$ |
| (d) | $<N^b_1, N^b_3>$ | $N_2$ |
|  | $<N^b_3, N^b_{10}>$ | $N_4, N^b_5, N_6, N^b_7, N_8, N^b_9$ |
|  | $<N^b_5, N^b_7>$ | $N_6$ |
|  | $<N^b_7, N^b_9>$ | $N_8$ |
| (e) | $<N^b_3, N^b_3>$ | $N_1, N_2, N_4, N_5$ |

As illustrated in the table, FIG. 3a has three phases so that the statements in each phase cannot execute concurrently with statements in separate phases. However, the OPENMP semantic restriction on barriers does not apply to threads in different teams, such as a program with nested parallel regions that may have several thread teams active at the same time. For example, FIG. 3d has a first parallel region of $N^b_5$ through $N^b_9$ that is nested in a second parallel region of $N^b_1$ through $N^b_{10}$. Barriers of the first inner region are not considered barriers of the second outer region so that separate teams executing in the outer region may concurrently execute nodes within the inner region.

Referring now to FIG. 4, a static phase partitioning algorithm is depicted. The algorithm depicted in FIG. 4 computes static phases in an OPENMP subroutine at compile-time by working on basic blocks instead of statements since all statements in the same basic block belong to the same phase. A static phase is a sequence of nodes along all barrier free paths in control flow graph that start at one barrier node and end at another barrier node in the same parallel region. The static phase algorithm does a forward depth-first search and a backward depth-first search from each barrier node, such as barriers defined by barrier, entry, exit, parallel-begin, and parallel end directives. During the search, if a barrier node in the same parallel region is encountered, the search does not continue with successors or predecessors of the barrier node. In a forward search from a barrier node, the value of the barrier node is set in p_start, and in a backward search from a barrier node the value of the barrier node is set in p_end. The phase variable defines the set of nodes determined to belong to a phase and the in_phase variable defines the set of phases that a node belongs to. The p_start variable defines the set of starting barriers of phases that a node belongs to. The p_end variable defines the set of ending barriers of phases that a node belongs to. The following table depicts the notations used in the static phase partitioning algorithm:

| | |
|---|---|
| ORC(N) | The immediate enclosing OpenMP construct for node N. |
| ORC(N).type | The type of ORC(N), i.e. root, do, sections, section, critical, single, master, ordered. |
| ORC(N).crit.name | The name for ORC(N) whose ORC(N).type is critical |
| ORC(N).ordered.bound | The bounding worksharing do loop for ORC(N) whose ORC(N).type is ordered |
| ORC(N).parent | The parent OpenMP construct of ORC(N) in the OpenMP region tree |
| ORC(N).pregion | The parallel region that encloses ORC(N) |

The static phase partitioning algorithm essentially separates a subroutine's control flow graph into several disconnected sub-graphs for each barrier node in a parallel region. Since nested parallel regions are fairly rare in actual OPENMP programs and each sub-graph of a parallel region contains only two barrier nodes, the complexity of the static phase algorithm linear to the number of nodes in the control flow graph.

Figure 5:
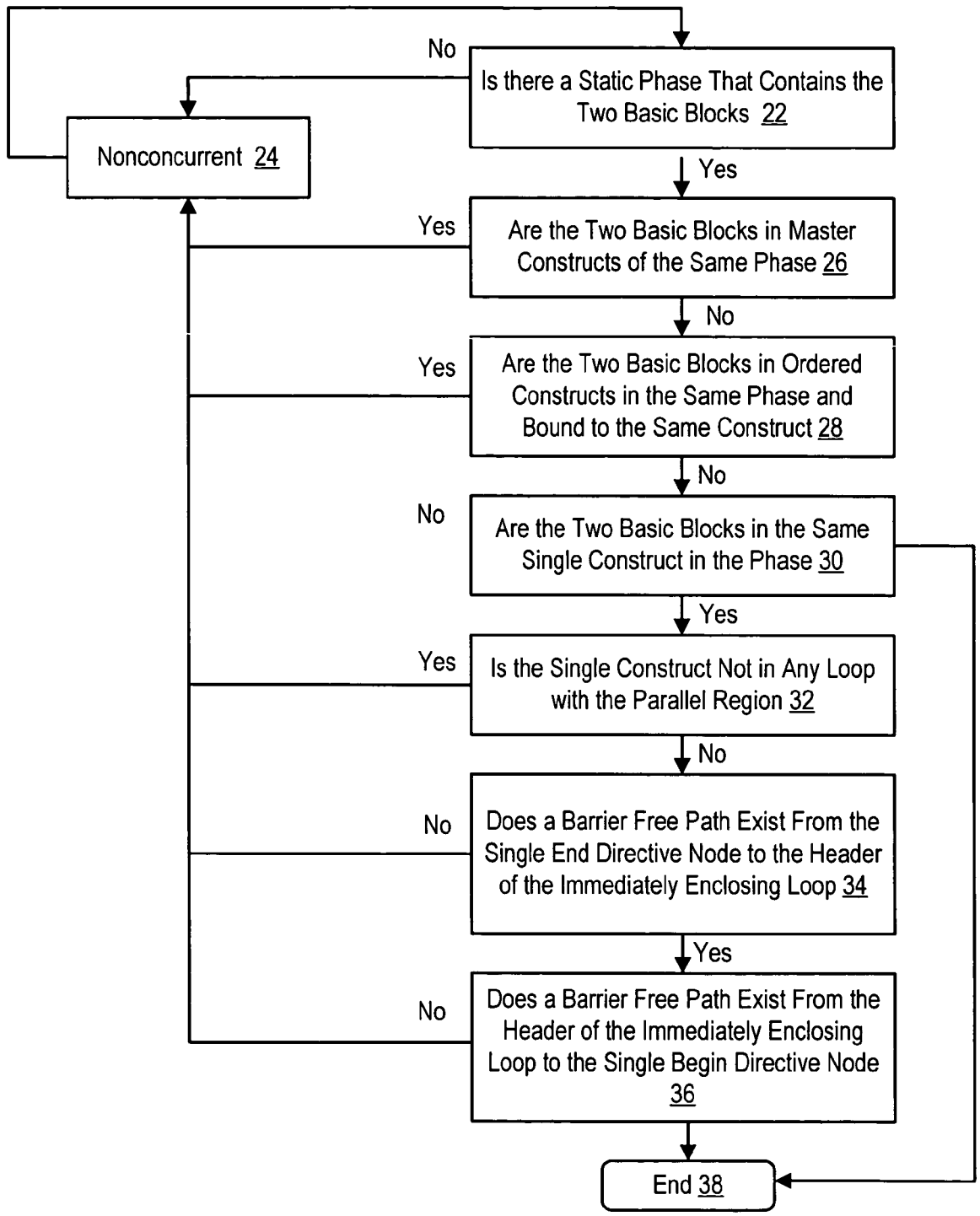
FIG. 5 depicts a flow diagram of a process for determining non-concurrency of a parallel program.

Referring now to FIG. 5, a flow diagram of a process for determining non-concurrency of a parallel program is depicted. The determination of non-concurrency applies the phases identified by the static phase detection algorithm to confirm that any two statements in a subroutine will not execute concurrently. Basic blocks are used in the non-concurrency analysis since two statements are executed concurrently only if their basis blocks are executed concurrently. The process begins at step 22 with a determination of whether there exists a static phase that contain both basic blocks under consideration. If no, the process proceeds to step 24 to conclude that the two basic blocks are non-concurrent and returns to step 22 for determination of non-concurrency of another two statements. The query at step 22 recognizes that two nodes in a parallel region that do not share any static phase also do not have current runtime instances and therefore will not have statements executed concurrently by different threads in the team that executes the parallel region.

Although compile-time determination of concurrency is non-deterministic within a phase, the semantics of OPENMP constructs prohibits some statements within the same phase from concurrent execution to allow a determination of non-concurrency in some situations. At step 26, a determination of whether the two basic blocks are in master constructs of the same phase indicates non-concurrency. At step 28, a determination that two statements' blocks are in ordered constructs in the same phase and bound to the same construct indicates non-concurrency. If, at step 30, two statements' blocks are in the same single construct in a phase, non-concurrency is indicated where the conditions of any of steps 32, 34 or 36 are met. At step 32, non-concurrency is indicated if the single construct is not within any loop within the parallel region. At step 34, non-concurrency is indicated if the single construct is in a loop within the parallel region and none barrier-free path exists from the single end directive node to the header of the immediately enclosing loop. At step 36, non-concurrency is indicated if the single construct is in a loop within the parallel region and no barrier-free path exists from the header of the immediately enclosing loop to the single begin directive node. The non-concurrency analysis of single constructs relies on the OPENMP semantic that requires a single construct to be executed by only one thread in a team, although a specific thread is not required. If the single construct is inside a loop, then two different threads may each execute one instance of the single construct in different iterations so that, if no barrier exists, the two threads could execute the construct concurrently. If none of the conditions of steps 32, 34 or 36 are met, concurrent execution could occur and the process ends at step 38 without an indication of non-concurrency.

Figure 6:
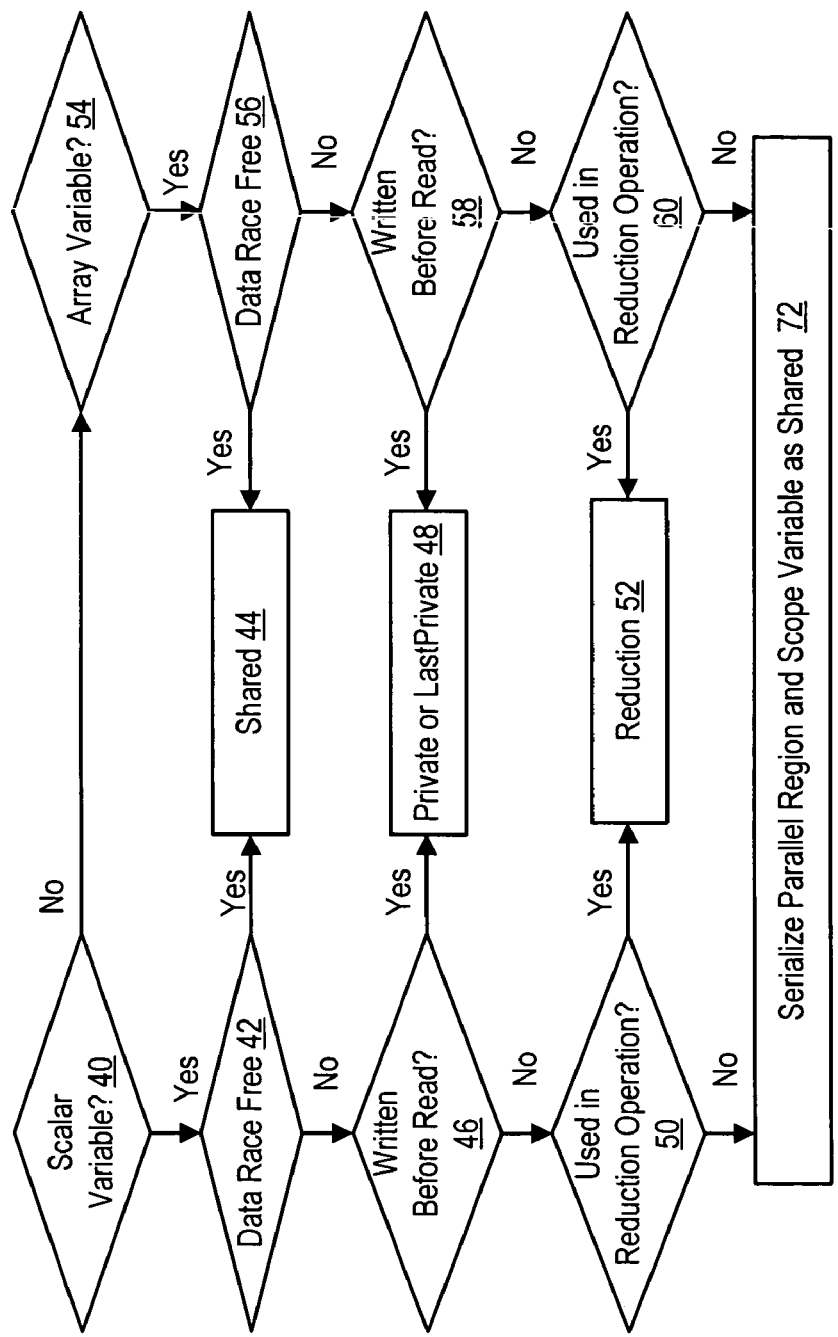
FIG. 6 depicts a flow diagram of a process for automated scoping of variables in a parallel program.

Referring now to FIG. 6, a flow diagram of a process for automated scoping of variables in a parallel program is depicted. The scoping process depends upon whether the variable is a scalar variable or an array variable. The process for scalar variables begins at step 40. At step 42, variables that are free of data race in the parallel region are scoped as SHARED at step 44. The variable is found data race free if the process depicted by FIG. 5 determines non-concurrency. At step 46, if in each thread executing the parallel region the variable is always written before read by the same thread, then at step 48 the variable is scoped as PRIVATE. If the variable at step 46 also is read before write after the parallel region and the parallel construct is either a parallel do or a parallel sections, then at step 48 the variable is scoped LASTPRIVATE. At step 50, if the variable is used in a reduction operation then at step 52 the variable is scoped as REDUCTION of the type recognized.

The scoping process of array variables begin at step 54. At step 56 a determination is made of whether the variable is free of data race in the parallel region, in which case at step 44 the variable is scoped as SHARED. The variable is found data race free if the process depicted by FIG. 5 determines non-concurrency. At step 58, if in each thread executing the parallel region the array elements of the array are always written before read by the same thread, then at step 48 the variable is scoped as PRIVATE. If at step 58 any element written in the parallel region is also read before write after the parallel region and the parallel construct is either a parallel do or a parallel sections, then at step 48 the variable is scoped as LASTPRIVATE. At step 60, if the variable is used in a reduction operation then at step 52 the variable is scoped as REDUCTION of the type recognized.

In the case where step 50 or step 60 fails, the process continues to step 62 for management of the compile as not able to scope the variable. The management can be serializing the parallel region and scoping the variable as shared or a message may be displayed to the user for manual management of the compile as failed.

Although the present invention has been described in detail, it should be understood that various changes, substitutions and alterations can be made hereto without departing from the spirit and scope of the invention as defined by the appended claims.

What is claimed is:

1. A method for compile-time detection of non-concurrency in a parallel program having a base language and a parallel programming language, the method comprising:
   modeling a program control flow of a subroutine of the parallel program, utilizing at least one processing unit, in a control flow graph having plural phases, wherein each phase having plural nodes;
   modeling a program hierarchical loop structure of the subroutine of the base language and a parallel programming language constructs in a region tree of the subroutine, utilizing the at least one processing unit, wherein the region tree comprises at least one construct edge defining a cycle between at least one end construct directive node and at least one begin construct directive node, wherein the at least one construct edge does not reflect control transfer of a the subroutine;
   analyzing the control flow graph and the region tree, utilizing the at least one processing unit, to identify plural parallel regions;
   analyzing a parallel region, utilizing the at least one processing unit, to identify plural static phases, each static phases having one or more nodes; and
   comparing nodes of the control flow graph and nodes of the static phases, utilizing the at least one processing unit, to determine non-concurrency at compile time for nodes in the same phase.

2. The method of claim 1 wherein the parallel programming language comprises an OPENMP parallel programming language.

3. The method of claim 1 wherein analyzing a parallel region further comprises:
   performing a forward depth-first-search of the parallel region from an each barrier node through subsequent nodes to a subsequent barrier node;
   performing a backward depth-first-search of the parallel region from each barrier node through preceding nodes to a preceding barrier node; and
   determining one or more phases associated with each non-barrier node of the parallel region.

4. The method of claim 1 wherein comparing nodes of the control flow graph and nodes of the static phases further comprises:
   determining non-concurrency for nodes in master constructs of the same phase.

5. The method of claim 1 wherein comparing nodes of the control flow graph and nodes of the static phases further comprises:
   determining non-concurrency for nodes in ordered constructs in the same phase that are bound to the same construct.

6. The method of claim 1 wherein comparing nodes of the control flow graph and nodes of the static phases further comprises:
- determining that two nodes are in the same phase and same single construct; and
- determining non-concurrency for the nodes if the single construct is not in any loop with the parallel region.

7. The method of claim 1 wherein comparing nodes of the control flow graph and nodes of the static phases further comprises:
- determining that two nodes are in the same phase and same single construct; and
- determining non-concurrency for the nodes if none barrier free path exists from the single construct end directive node to the header of the immediately enclosing loop.

8. The method of claim 1 wherein comparing nodes of the control flow graph and nodes of the static phases further comprises:
- determining that two nodes are in the same phase and same single construct; and
- determining non-concurrency for the nodes if none barrier free path exists from the header of the immediately enclosing loop to the node directive.

9. A method for compiling a parallel program having variables in parallel regions divided by barriers, wherein the parallel program having a base language and a parallel programming language, the method comprising:
- automatically assigning scopes to variables, utilizing at least one processing unit, based on functions performed on the variables;
- automatically identifying a variable in a parallel region that has one or more functions performed on the variable in the parallel region, utilizing the at least one processing unit, such that the variable in the parallel region has not been automatically assigned a scope;
- automatically partitioning the parallel region into plural phases, utilizing the at least one processing unit, the variable in the parallel region associated with one or more of the phases;
- automatically performing a non-concurrency analysis on the variable in the parallel region, utilizing the at least one processing unit, to confirm the variable in the parallel region is free of data race, wherein performing the non-concurrency analysis further comprises:
  - modeling a program control flow of the parallel program in a control flow graph having plural phases, wherein each phase having plural nodes;
  - modeling a program hierarchical loop structure of a subroutine of the base language and a parallel programming language constructs in a region tree of the subroutine, utilizing the at least one processing unit, wherein the region tree comprises at least one construct edge defining a cycle between at least one end construct directive node and at least one begin construct directive node, wherein the at least one construct edge does not reflect control transfer of the subroutine; and
- automatically assigning a shared scope to the variable in the parallel region, utilizing the at least one processing unit, if the variable in the parallel region is free of data race.

10. The method of claim 9 further comprising:
- determining that the non-concurrency analysis fails to confirm that the variable is free of data race; and
- serializing the parallel region to assign a scope to the variable.

11. The method of claim 9 wherein the program comprises an OPENMP program.

12. The method of claim 11, wherein performing the non-concurrency analysis further comprises:
- analyzing the control flow graph and the region tree to identify plural parallel regions;
- analyzing the parallel region associated with the variable to identify plural static phases, each static phases having one or more nodes; and
- comparing nodes of the control flow graph associated with the variable and nodes of the static phases to determine non-concurrency at compile time for nodes in the same phase.

13. The method of claim 12 wherein analyzing the parallel region further comprises:
- performing a forward depth-first-search of the parallel region from an each barrier node through subsequent nodes to a subsequent barrier node;
- performing a backward depth-first-search of the parallel region from each barrier node through preceding nodes to a preceding barrier node; and
- determining one or more phases associated with each non-barrier node of the parallel region.

14. The method of claim 12 wherein comparing nodes associated with the variable and static phases further comprises:
- determining non-concurrency for nodes that do not belong in the same phase.

15. The method of claim 12 wherein comparing nodes associated with the variable and static phases further comprises:
- determining non-concurrency for nodes in master constructs of the same phase.

16. The method of claim 12 wherein comparing nodes associated with the variable and static phases further comprises:
- determining non-concurrency for nodes in ordered constructs in the same phase that are bound to the same construct.

17. The method of claim 12 wherein comparing nodes associated with the variable and static phases further comprises:
- determining that two nodes are in the same phase and same single construct; and
- determining non-concurrency for the nodes if the single construct is not in any loop with the parallel region.

18. The method of claim 12 wherein comparing nodes associated with the variable and static phases further comprises:
- determining that two nodes are in the same phase and same single construct; and
- determining non-concurrency for the nodes if none barrier free path exists from the single construct end directive node to the header of the immediately enclosing loop.

19. The method of claim 12 wherein comparing nodes associated with the variable and static phases further comprises:
- determining that two nodes are in the same phase and same single construct; and
- determining non-concurrency for the nodes if none barrier free path exists from the header of the immediately enclosing loop to the node directive.

* * * * *